EXAMINEI
Sept. 19, 1950 T. D. WINTERS 2,523,173
MULTIPLE TELEVISION SYSTEM
Filed May 6, 1948
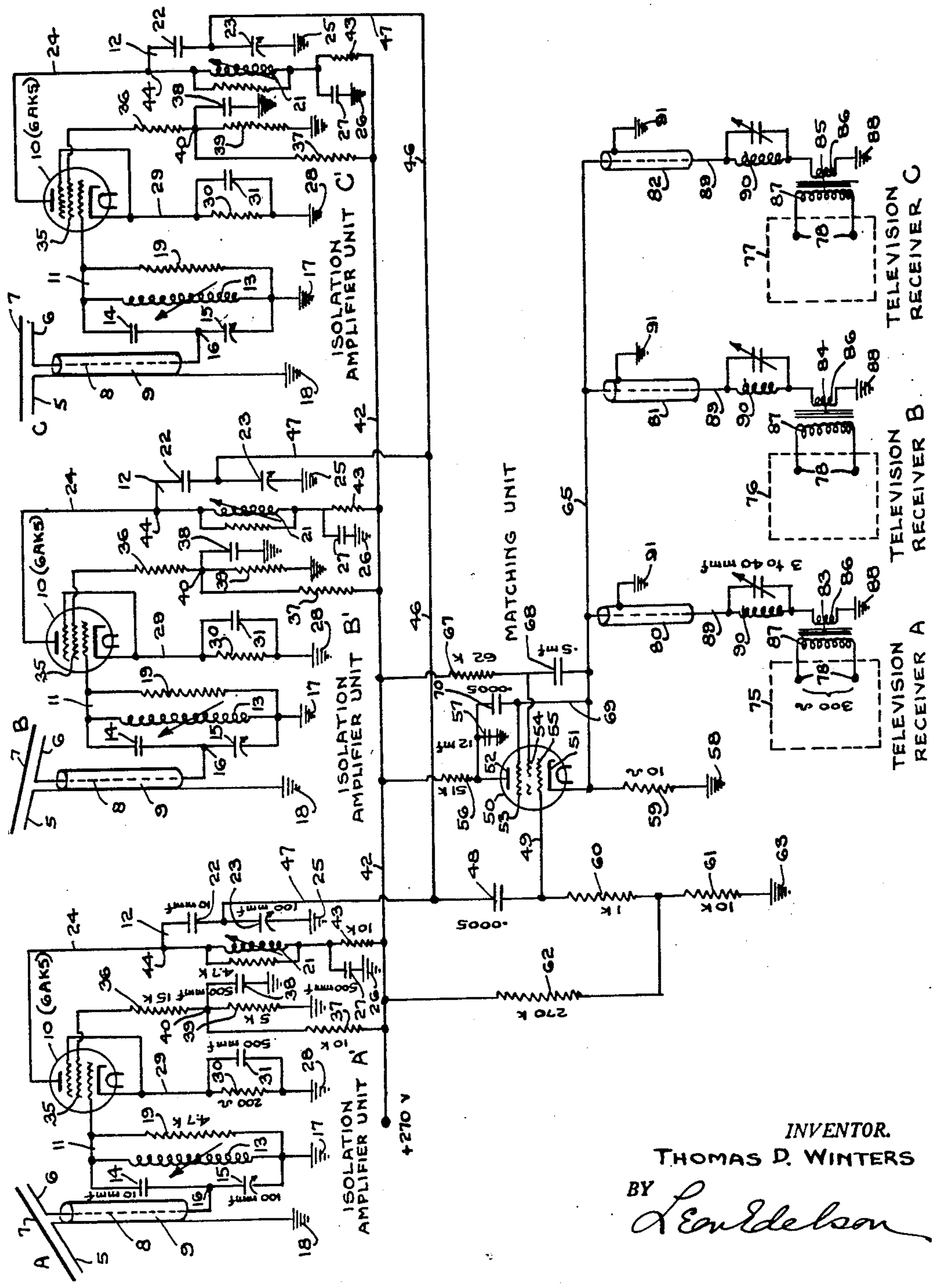
INVENTOR.
THOMAS D. WINTERS
BY Leon Edelson

EXAMINER

Patented Sept. 19, 1950 2,523,173

UNITED STATES PATENT OFFICE 2,523,173

MULTIPLE TELEVISION SYSTEM

Thomas D. Winters, Philadelphia, Pa., assignor to Multenna Corporation, Philadelphia, Pa., a corporation of Pennsylvania Application May 6, 1948, Serial No. 25,332

6 Claims. (Cl. 250—20)

The present invention relates to an antenna system for high frequency modulated signal distribution, and more particularly to a multiple antenna system for the reception of television signals of different channels or frequency bands and for the distribution of such signals to a plurality of utilization outlets or receivers.

In the reception and distribution of television signals, both sound and picture signals are picked up on the same antenna and from a predetermined direction in a predetermined frequency band or channel. Where several channels or bands of such signals are available at a given location of the receiver, it has been difficult to provide suitable antenna means capable of receiving the signals of different frequencies for selective distribution thereof to a plurality of utilization means or utilization outlets without interaction or interference between the various signals in the different bands and without interaction or interference between the various utilization outlets or receivers connected thereto.

Such receiving and distribution systems are as desirable and necessary for high frequency modulated signal distribution as for broadcast band reception and distribution, particularly in congested locations where a multiplicity of outlets or receivers must be provided for in connection with a single antenna installation. Otherwise on apartment houses and the like, a maze of antennas with a high degree of interaction between them would be the result.

Having in mind the foregoing, it is a primary object of the present invention to provide an improved antenna system for high frequency multi-channel modulated signals, which is particularly adapted for use in the reception and distribution of television signals in differing bands and from different directions, and to provide a large number of outlets or utilization points in connection therewith, without interaction between received signals or between such utilization means.

Still another object of the invention is to provide an improved antenna system for efficient reception and distribution of high frequency signals transmitted in a plurality of different frequency bands and from different directions, the system being especially characterized in that it includes a simplified and effective impedance matching unit between a plurality of antenna elements and a plurality of frequency selective utilization means or receivers, each of the latter being tunable to the signals of any one of the several available frequency bands or channels.

It is also an object of the invention to provide an improved and simplified antenna system for high frequency modulated signal distribution which is readily adapted for the reception and distribution of both television and broadcast signals as well as broadcast frequency modulated signals, and to permit the connection therewith of differing utilization devices, such as tunable receivers for the various services above referred to.

It is an important and further object of the invention to provide an improved antenna system for the reception of a plurality of signals in differing frequency bands which embodies a minimum number of electronic tubes and apparatus and which is adapted for easy installation and maintenance at low cost.

In accordance with the invention, a plurality of dipole or other directional high frequency antenna units are mounted in a group in an elevated position substantially clear of all local shielding and reflecting obstacles, and are individually oriented for optimum reception in different directions and in different frequency bands or channels. A co-axial cable connection is provided between each antenna unit and an isolation amplifier unit comprising an electronic amplifier tube and broadly tunable input and output circuits therefor, a separate isolation amplifier unit being provided for each antenna unit, whereby the system may be made not only directionally responsive but also frequency responsive broadly to differing high frequency modulated signals in different frequency bands.

A single matching unit is provided in connection with the output circuits of each of the isolation amplifier units which unit comprises a single electronic amplifier tube having a low impedance input bus circuit and a low impedance output bus circuit, the output circuit being of an impedance lower than the impedance of any utilization device to which it may be connected.

All of the electronic tube amplifier means in the system are of the screen grid type, whereby the input and output circuits are isolated or shielded. While the isolation amplifier units are broadly tuned, the matching unit is arranged to have no frequency response within the operating frequency range of the antenna system, whereby it offers the same impedance to all signals and provides a common coupling or matching connection between the matching unit input bus circuit and output bus circuit, the former being connected to the isolation amplifier units in parallel and the latter being connected to a plurality of utilization outlet circuits in parallel.

The outlet connections from the matching unit output bus correspond in number to the number of utilization devices or receivers to be connected for reception service from the various antenna units, which in number are equal to the number of frequency bands or channels for which reception is desired.

Each of the utilization outlet circuits comprises a coaxial cable connection extending from the matching unit to a selected utilization point and a matching transformer at the utilization point having output terminals adapted to be connected to a utilization device, such as a television receiver, for example. The matching transformer steps up the impedance from the low impedance output circuit of the matching unit to the input impedance of the utilization device or receiver, which for television receivers is of the order of 300 ohms, generally.

It is also an object of the invention to provide an antenna system of the character above described in which each of said isolation amplifier units includes an improved and simplified broad-band tuning circuit and an improved resistance-coupled matching unit which provides a full frequency response over the desired frequency spectrum or frequency bands and which permits distribution of signals in such spectrum or bands to isolated utilization points by simple co-axial cable means without signal energy loss or interaction between the various utilization devices or receivers.

Because of its particular adaptation for the reception and distribution of a plurality of differing television signals in differing channels or frequency bands for use in connection with a plurality of television receivers and the like, the invention will further be described in connection with a present preferred embodiment thereof for multi-channel television signal reception, as shown by the schematic circuit diagram comprising the single figure of the accompanying drawing, to which attention is now directed.

Referring to the drawing, a plurality of antenna units A, B and C are provided for orientation in different directions, as indicated, for the reception of television signals in three different channels or bands. Any number of such antenna units may be provided, depending upon the number of channels or bands which it is desired to receive, such units being preferably mounted in spaced relation to each other in a unitary group.

Each of the antenna units is preferably of the type comprising dipole elements 5 and 6 and a reflector 7. One of the dipole elements 6 is connected to the inner conductor 8 of a coaxial cable, the outer conductor 9 of which is connected to the other dipole element 5. Each of the co-axial cables 8—9 extends to a separate isolation amplifier unit provided for each antenna unit, said isolation amplifier units being respectively designated in the drawing by the reference letters A', B' and C'.

Each of the isolation amplifier units comprises an electronic screen grid amplifier tube 10, having a tunable input grid circuit 11 and a tunable output anode circuit 12. The input grid circuit comprises a variable tuning inductance 13 and a shunt tuning capacity therefor consisting of a fixed capacitor 14 and a variable capacitor 15 connected in series across the tuning inductance 13, with the antenna or co-axial cable conductor 8 connected to a junction 16 between the capacitors 14 and 15. The grid input circuit 11 is connected to ground, as indicated at 17, and likewise the outer cable conductor 9 is connected to ground, as indicated at 18, which ground connection must carefully be located adjacent to the ground connection 17, since the antenna input circuit is thereby connected directly across or in shunt with the variable tuning capacitor 15.

The frequency response or tuning of the input circuit is adjusted by means of the variable inductance 13 and the variable tuning capacitor 15. The latter simultaneously varies the antenna coupling and the tuning for response to a selected signal channel or frequency band, and the response in that band is made relatively broad through the use of a shunt resistor 19 connected in parallel with the input circuit as indicated.

The output anode circuit includes a similar variable tuning inductance 21 and series-connected capacitors 22 and 23 connected between the anode lead 24 and ground indicated at 25. The inductance 21 is also connected to ground, as at 26, for high frequency signals, through a by-pass capacitor 27, thereby providing a low impedance path between the tube cathode and each of the input and output circuits 11 and 12. The cathode is further connected to ground, as at 28, through a lead 29 and a bias resistor 30 having a shunt high-frequency by-pass capacitor 31.

It will be noted that the output circuit 12 is also provided with a shunt resistor 32 connected across the tuning inductance 21 to broaden the frequency response thereof. The tuning is adjusted by means of the variable tuning inductance 21 and the variable tuning capacitor 23 to the same channel or frequency band for which the input circuit is made responsive.

Interaction between the input and output circuits is prevented by a screen grid 35 in the tube 10 and by a filter circuit therefor comprising a series resistor 36 directly connected to the screen grid 35, a second filter resistor 37 in series therewith and a shunt filter capacitor 38, together with a bleeder resistor 39, the latter being interposed between ground and the common junction point 40 of the resistors 36 and 37 and the capacitor 38. Screen grid and anode potentials are taken from any suitable grounded power supply source (not shown), to the positive or anode line 42 of which is connected the resistor 37. The anode circuit likewise receives positive potential with respect to ground over the lead 42 through a filter resistor 43 for which the capacitor 27 provides the additional filter element.

As each of the several isolation amplifier units A, B and C are identical, the same reference numerals have been applied to the various circuit elements thereof throughout, the operation of each of the units being the same except that each is tuned to a different frequency band or channel for subsequent operation without further adjustment of the tuning means. It will be noted that in the isolation amplifier unit A certain of the circuit elements are provided with legends indicating the various electrical values of certain of the circuit components which are representative of values preferably employed in the illustrated embodiment of the invention. These values, however, are indicated merely by way of example and may be varied as circumstances may

EXAMINER require, and accordingly, it is to be understood that the present invention is not intended to be limited by or restricted to the indicated values. It will likewise be noted that the electronic amplifier tubes 10 may be of the commercially available type known as a 6AK5, also as indicated in the drawing in connection with the isolation amplifier unit A. Any other suitable screen-grid tube may however be used.

The signal output connection from each of the isolation amplifier units is taken from a terminal 44 between the tuning capacitors 22 and 23 across the output anode circuit 12. This connection 44 corresponds to the input connection 16 and provides for varying the capacity across the output circuit as the tuning is varied, since the capacitor 23 is connected to ground and chassis, as indicated at 25. The respective ground connections are located at points on the chassis substantially close together in each of the several isolation amplifier units in order to provide for circuit tuning without interaction or interference with other circuits having common chassis connections therewith.

Each of the output terminals 44 of the isolation amplifier units is connected with a lead or bus circuit line 46 for an impedance matching unit, through short leads indicated at 47. This matching unit input circuit bus 46 is connected through a coupling capacitor 48 with the input grid circuit 49 of a screen grid electronic amplifier tube 50 having a cathode 51, an anode 52, a space-charge grid 53 adjacent to the anode, a screen grid 54 and a control grid 55 arranged as indicated in the drawing. This may be provided by any suitable screen grid tube such as a 6AK5 commercial tube above mentioned.

The anode 52 is connected to the positive anode supply lead 42 through a filter resistor 56 and is provided with a shunt filter capacitor 57 connected between the anode and ground, to isolate the anode, at operating frequencies, from the supply circuit 42 in much the same manner as the filter circuit provided for the screen grid 35 of the isolation amplifier tubes 10.

The cathode 51 is connected to ground, as indicated at 58, through a low impedance coupling resistor 59 which may have a value of 10 ohms as indicated. This provides a cathode coupling output impedance for the impedance matching unit. The control grid is connected with the grid circuit 49 which includes a coupling resistor 60 and an isolating resistor 61 having a high impedance bleeder connection with the positive anode supply lead 42 through a high impedance resistor 62. With this arrangement, the resistor 61 is connected to ground as indicated at 63 which is accurately located with respect to the ground connection 58 for the cathode and the ground connection for the bypass capacitor 57 for the anode, whereby no external coupling is permitted with other circuits.

Bleeder current through the resistors 62 and 61 provides a biasing potential on the grid 55 in opposition to the biasing potential provided by the resistor 59 and the resultant negative biasing potential permits the anode current of the tube 50 to be regulated whereby it may operate as a low impedance coupling device between the matching unit input bus line 46 and the matching unit output bus connection or distribution lead 65 connected with the cathode coupling resistor 59. The entire output of the tube, therefore, is taken across the low impedance resistor 59 since the anode is shunted to ground through the by-pass capacitor 57. The input signal is delivered to the control grid 55 through the coupling capacitor 48 across the grid circuit 49 in which are located the coupling impedances 60 and 61 which are effective in the circuit as a low impedance coupling element.

The screen grid 54 is connected to the positive supply lead 42 through a filter network comprising a series resistor 67 and a shunt by-pass capacitor 68 from the screen grid to the cathode. Likewise, the cathode or space-charge grid 53 is connected to cathode through a lead 69 and is by-passed to ground through a capacitor 70 and the anode by-pass capacitor 57.

The output circuit 65 for the matching unit, the matching unit per se, the isolation amplifier units, and the input bus connection 46, may all be located at a central point in any installation, for connection with the remotely located antenna units and with the utilization outlets or apparatus through the medium of simple co-axial cables in each case. With proper shielding between the isolation amplifier units and for the matching unit, all elements may be located in a single compartment container of any suitable and well-known type (not shown). This arrangement is at present preferred and simplifies the installation, since only the antenna co-axial cable connections are required for signal input and the operating potentials may be derived from any suitable self-contained means in connection with the usual alternating current outlet. As the alternating current supply means for the amplifiers and the anode supply means do not concern the invention, the same are not shown.

In the present example three utilization devices or receiver units are indicated in dotted outline at 75, 76 and 77. These devices may be, for example, television receivers A, B and C, each having 300 ohm input terminals 78 for which a signal supply or antenna connection is desired, the receivers being located in three different apartments in the usual apartment house. The three receivers shown represent any number of such receivers or utilization apparatus for which a signal outlet is desired in connection with a centralized and single antenna installation for the reception of television and other high frequency modulated signals.

The antenna and distribution system of the present invention provides a relatively simple and low cost connection for each of such utilization outlets. The extended outlet connections are provided by a number of coaxial cables 80, 81 and 82, for connection with the receivers or other utilization apparatus at each outlet. These cables are extended from the matching unit output bus 65 to each utilization point and are coupled to the output terminals or utilization terminals 78 through matching transformers 83, 84 and 85 respectively in the present example. Each transformer is provided with a low impedance primary winding 86 and higher impedance secondary winding 87, preferably electrostatically shielded one from the other, the secondary terminals being connected with the terminals 78 for the utilization outlet or device.

The primary windings 86 are connected to ground at one end, as indicated at 88, and at the opposite end are connected to the coaxial cable central conductor 89 in which may be located a suitable series wave trap 90 for the suppression of any oscillator signal emanating from another television receiver operating in the system and which might cause interference with reception by a given receiver. Preferably, these wave traps 90 each include an inductance coil and a shunt variable capacitor, the inductance coil being operative to prevent feed-back to the transmission line of signals developed by the superheterodyne oscillator of a receiver in operation. In certain instances it may be desirable to include in the wave trap an alternative inductance with suitable switch gear for rendering it operative to suppress the interfering signal transmitted in a different frequency channel. The outer conductor of the coaxial cable is grounded as indicated at 91 to provide a return path to the matching unit.

The transformer unit is of relatively small size and may be mounted in any suitable location such as at a baseboard in rear of the television receiver installation with the usual twin conductor connection therefrom to the terminals 78, while the supply connection back to the matching amplifier unit and isolation amplifiers is provided by means of the extended coaxial cables 80, 81 and 82 and others as may be necessary for additional installation outlets (not shown) as they may be required at any installation.

Transformers 83, 84 and 85 step up the impedance of the coaxial cable and of the matching unit output bus connection to the impedance at the input terminals of the utilization apparatus. In this case, the low impedance matching unit output connection is stepped up in impedance to 300 ohms from a value which may be lower than any load impedance to be connected with the matching unit. In the present example an impedance of the order of 50 ohms is preferred. A value of 52 ohms as indicated in connection with the cathode coupling impedance 59 has been used with good results when the primary impedance is stepped up to 300 ohms, also as in the present example.

With such a low output impedance circuit for high frequency signal distribution, stray signal pickup from any source is substantially prevented in any case, and in addition the coaxial cable connection provide further shielding for the distribution circuits. The matching transformers, together with the low impedance of the distribution circuit of the order of 50 ohms effectively prevents interaction or feed-back from one utilization device to the other through the common distribution circuit connection at the matching unit output bus circuit 65.

Furthermore, as hereinbefore noted, the input circuit to the matching unit is of relatively low impedance as determined by the series grid resistors 60 and 61 into which the matching unit input bus 46 supplies signals through the coupling capacitor 48. In the example shown, the electrical resistance of this circuit is relatively low, being of the order of 11,000 ohms. With a cathode-coupled and grounded output circuit, and with resistance coupling throughout for the matching unit, the coupling between the input bus circuit and the output bus circuit is substantially without frequency characteristic in the range of frequencies for which the system is designed to operate. The amplifier 50 and its associated circuits, therefore, have no appreciable frequency effect upon the incoming signals and, therefore, transmit all signals with equal efficiency and without distortion.

The directional antenna units and the isolation amplifier units determine the signal selection or band of frequencies to be transmitted through the antenna system and within the bands of signals transmitted, the utilization means or receivers may be tuned for exact response to any selected signal with a relatively high signal amplitude since losses in the system are compensated for by the use of amplification in both the isolation amplifier units and in the matching unit.

While the system has been shown in its adaptation for the reception of high frequency television signals and the like, it is obvious that it may be utilized in the same manner for the reception and distribution of other high frequency modulated signals.

What is claimed to be new and useful is:

1. An antenna system for high frequency signal distribution comprising in combination, a plurality of directional receiving antenna units, an amplifier unit for each antenna unit including tunable amplifier input and output circuits having a broad band frequency response to different predetermined signal channels, a single matching amplifier unit having a low impedance common signal input circuit connection with each of said amplifier units and a low impedance output circuit connection, and a plurality of signal utilization outlet circuits each including a matching transformer and a coaxial cable connecting each transformer with said output circuit connection of the matching amplifier unit.

2. An antenna system for high frequency signal distribution as defined in claim 1, wherein each isolation amplifier unit includes an inductance and two series capacitors in shunt therewith together with a resistance load in each of the input and output circuits, a coaxial cable input connection between said capacitors in the input circuit and an output connection between said capacitors in the output circuit with the matching unit signal input circuit.

3. An antenna system for high frequency signal distribution comprising in combination, a plurality of centralized directional receiving antenna units oriented for reception in different directions and mounted in spaced parallel relation to each other as a unitary group, an isolation amplifier unit for each antenna having a coaxial cable connection therewith, each of said amplifier units including tunable amplifier input and output circuits having a broad-band frequency response to a different predetermined signal channel, a single matching amplifier unit of the screen-grid, resistance-coupled type having a lot impedance common signal input circuit connection with each of said first named amplifier units and a cathode-coupled low impedance signal output circuit of the order of 50 ohms providing an output bus connection, a plurality of signal utilization outlets including a matching transformer, and a coaxial cable connecting each transformer with said output bus connection.

4. An antenna system comprising in combination, a plurality of grouped dipole antennas individually oriented for optimum reception in different directions, a plurality of isolation amplifier units each comprising broadly tunable input and output circuits, one amplifier unit being provided for each antenna unit, means providing a coaxial cable signal input connection between each antenna unit and one of said amplifier units, a single impedance-matching cathode-coupled amplifier unit of the screen-grid type having a low impedance input bus circuit coupled jointly to each of said first named amplifiers to receive signal energy therefrom at different frequencies,

EXAMINER a low impedance output bus circuit for said matching unit, and means providing a plurality of signal outlet connections from the matching unit output bus circuit corresponding in number to the number of utilization devices to be connected for reception service from said antenna units, said outlet connection means each comprising a coaxial cable extending from the matching unit output bus circuit to a selected predetermined utilization point, and a matching transformer at the utilization point connected with each of said coaxial cables, said transformers having step-up impedance ratios for matching the input impedance of frequency selective tunable utilization devices.

5. An antenna system for the reception and distribution of high frequency signals in predetermined frequency bands, comprising a plurality of dipole antennas individually oriented for optimum reception in different directions, a coaxial cable connection extending from each antenna to convey signals therefrom, a screen-grid electronic amplifier coupled to each of said cables and including a tunable input circuit and a tunable output circuit responsive to a predetermined frequency band, a variable tuning capacitor and a fixed tuning capacitor connected in series across each of said tunable circuits, means providing an amplifier input connection for said co-axial cables between said series connected capacitors in each of the input circuits of said amplifiers, a signal output terminal between each of the series connected capacitors in each of the output circuits of said amplifiers, a screen-grid impedance matching unit having a low impedance input grid circuit coupled in common to all of said output connections, a low impedance cathode-coupled output circuit for said matching unit, a plurality of distribution circuits comprising coaxial cable connections extending from said last named output circuit, and an impedance matching transformer terminating each of said cable connections at different distribution points.

6. An antenna system for the reception and distribution of high frequency signals in predetermined frequency bands, as defined in claim 5, wherein the impedance matching unit is provided with an output circuit having an impedance of less than 60 ohms whereby stray coupling and extraneous signal pickup is minimized, and wherein the impedance matching transformers provide a predetermined step-up ratio as an output connecting element for said cables and for preventing interaction between the distribution circuits.

THOMAS D. WINTERS.

REFERENCES CITED

The following references are of record in the file of this patent:

UNITED STATES PATENTS

| Number | Name | Date |
|---|---|---|
| 1,754,878 | Clement | Apr. 15, 1930 |
| 1,853,181 | Shumard | Apr. 12, 1932 |
| 1,918,393 | Holden | July 18, 1933 |
| 1,971,235 | Rettenmeyer | Aug. 21, 1934 |
| 2,393,971 | Busignies | Feb. 5, 1946 |
| 2,394,917 | Kallman | Feb. 12, 1946 |